United States Patent [19]

Takeda

[11] Patent Number: 5,569,481
[45] Date of Patent: Oct. 29, 1996

[54] PROCESS FOR PRODUCING FLAKE STYLE FOOD

[75] Inventor: Hideyuki Takeda, Ootemachi, Japan

[73] Assignee: Maruha Corporation, Tokyo, Japan

[21] Appl. No.: 443,490

[22] Filed: May 18, 1995

[30] Foreign Application Priority Data

Sep. 19, 1994 [JP] Japan .................. 6-223067

[51] Int. Cl.$^6$ .................. A23L 1/311; A23L 1/314
[52] U.S. Cl. .................. 426/574; 426/641; 426/643; 426/644; 426/646
[58] Field of Search .................. 426/641, 643, 426/644, 646, 104, 574, 589

[56] References Cited

U.S. PATENT DOCUMENTS

| | | | |
|---|---|---|---|
| 4,427,704 | 1/1984 | Cheney et al. | 426/574 X |
| 4,876,103 | 10/1989 | Kawano et al. | 426/574 |
| 5,225,231 | 7/1993 | Nakaie et al. | 426/641 |

OTHER PUBLICATIONS

Whistler et al, *Industrial Gums,* 2d ed., 1973, pp. 279, 308 & 327–328.

*Primary Examiner*—Arthur L. Corbin
*Attorney, Agent, or Firm*—Frishauf, Holtz, Goodman, Langer & Chick, P.C.

[57] ABSTRACT

A process for producing a flake style food which comprises adding a dehydrated vegetable and a polysaccharide thickener to a seasoning solution, emulsifying the obtained mixture by stirring at a high speed of from 1,000 to 10,000 rpm within a temperature zone of from 10° to 80° C. for 1 to 10 minutes and mixing the emulsified product thus obtained with one or more of fish meat, poultry meat or cattle meat which is in the form of flakes.

5 Claims, No Drawings

PROCESS FOR PRODUCING FLAKE STYLE FOOD

BACKGROUND OF THE INVENTION

1. Field of the Invention

This invention relates to a process for producing a flake style food. More particularly, it relates to a process for producing a flake style food of fish meat, poultry meat, cattle meat or artificial meat which has a good keeping stability and thus neither becomes watery nor suffers from any water liberation during storage following heat sterilization, requires no draining procedure prior to the use, retains the inherent wettable palatable ingredients and never suffers from any deterioration in flavor, texture or color tone.

2. Description of the Related Art

Flake style foods which have been prepared by thermally sterilizing fish meat, poultry meat, cattle meat or artificial meat in a packaged state are usually seasoned with a seasoning oil, brine or a seasoning solution. They can be either taken as such or used as a material for preparing various dishes, for example, the filling of salads or sandwiches.

When sterilized by heating in a packaged state, such a conventional flake style food would undergo so-called heat dripping (i.e., oozing-out of gravy from flakes). As a result, the flake style food becomes watery or suffers from water liberation during storage. Further, it shows dripping after opening the container. When the flake style food is mixed as such with mayonnaise or sauce (in the case of, for example, the preparation of the filling of salads or sandwiches), the oozing-out of the gravy makes the whole food product watery or causes water liberation, thus deteriorating the qualities of the salads or sandwiches. When the flake style food is to be used as a filling of sandwiches, for example, the oozing gravy moistens the bread and thus deteriorates the inherent texture and flavor of the sandwiches.

In order to avoid the above-mentioned deterioration in qualities, it has been attempted to sufficiently drain the flake style food when taking it out of a container so as to use it in a dehydrated state, though it requires much labor. In this case, however, there arises another problem that the gravy containing palatable ingredients is discarded at the draining.

A method was previously proposed for adding a dehydrated vegetable to a flake style food in order to solve these problems (U.S. Pat. No. 5,225,231). This method imparts excellent effects such that the water liberation during the storage following heat sterilization is prevented and that the flavor, texture or color tone of the flake style food is not deteriorated. However, according to this method, it is difficult to completely prevent water liberation from arising.

SUMMARY OF THE INVENTION

Therefore, it is an object of the present invention to provide a process for producing a flake style food of fish meat, poultry meat, cattle meat or artificial meat wherein the water separation during the storage following heat sterilization can be completely prevented and which never suffers from any deterioration in flavor, texture or color tone of the flake style food.

As the results of extensive studies, the present inventors have found out that the above-mentioned object can be achieved by adding a polysaccharide thickener such as a gum together with the dehydrated vegetables to the flake style food.

The present invention, which has been completed based on this finding, provides a process for producing a flake style food which comprises adding a dehydrated vegetable and a polysaccharide thickener to a seasoning solution, emulsifying the obtained mixture by stirring at a high speed of from 1,000 to 10,000 rpm within a temperature range of from 10° to 80° C. for 1 to 10 minutes and mixing the emulsified product thus obtained with one or more of fish meat, poultry meat or cattle meat which is in the form of flakes.

According to the process for producing a flake style food of the present invention, water liberation during storage following heat sterilization is completely prevented, so that it is possible to obtain a flake style food of fish meat, poultry meat, cattle meat or artificial meat which has a good keeping stability and thus neither becomes watery nor suffers from water liberation during storage following heat sterilization, requires no draining procedure prior to the use, retains the inherent wettable palatable ingredients and does not suffer from any deterioration in flavor, texture or color tone.

DETAILED DESCRIPTION OF THE INVENTION

The process for producing a flake style food of the present invention will be described in detail hereinafter.

Examples of the dehydrated vegetables to be preferably used in the present invention include ground and dehydrated mashed carrot, pumpkin, onion, sweet potato and potato, dehydrated apple pulp and a dietary fiber powder. It is desirable that the cell tissues of the above-mentioned ground or mashed dehydrated vegetables are not completely broken.

Examples of the polysaccharide thickener to be preferably used in the present invention include guar gum, locustbean gum, tamarind seed gum, xanthan gum, gum arabic, pectin, agar, alginic acid, carrageenan, pullulan, curdlan, gellan gum, konjak powder, cellulose and derivatives thereof (carboxymethylcellulose, crystallite cellulose), modified starch having heat resistance, and locustbean gum, xanthan gum, tamarind seed gum are particularly preferable.

Further, any combination of the above-mentioned dehydrated vegetable and the polysaccharide thickener may be preferably used, but particularly, the combination of onion which has chipped and dehydrated (referred to as dehydrated onion chip hereinafter) and tamarind seed gum, the combination of dehydrated onion chip and locustbean gum, and the combination of potato which has been ground and washed followed by dehydrating and xanthan gum are particularly preferable.

Examples of the seasoning solution to be used in the present invention include seasoning broth and seasoning brine commonly used for seasoning flake style foods.

Examples of the fish meat, poultry meat, cattle meat or artificial meat to be used in the present invention include those commonly used for producing flake style foods. Particular examples thereof include fish meats such as skipjack, tuna, salmon, cod, crab and scallop meats, poultry meats such as chicken and wild duck meat, cattle meats such as beef, pork, horse meat and mutton and artificial meats such as soy protein meat.

In the present invention, these meats are processed into flakes. These flakes may be either in a small size (2 to 5 mm) suitable as the filling of salads or sandwiches or in a large size (10 to 30 mm) containing meat masses. Namely, these meats may be loosened into piece fitting the common image of flake style foods.

Thus the process of the present invention may be embodied as follows. First, the above-mentioned dehydrated vegetable and the above-mentioned polysaccharide thickener is added to the above-mentioned seasoning solution and the resulting mixture is emulsified by stirring at a high speed of 1,000 to 10,000 rpm within a temperature zone ranging from 10° to 80° C. for 1 to 10 minutes, preferably at 2,400 to 3,500 rpm within a temperature zone ranging from 40° to 50° C. for 3 to 4 minutes.

In this case, the dehydrated vegetable may be preferably used in an amount of from 5 to 25 parts (by weight), more preferably from 10 to 20 parts per 100 parts of the seasoning solution, and the polysaccharide thickener may be preferably used in an amount of from 0.1 to 10 parts per 100 parts of the seasoning solution. However, it is necessary to adjust the amount of the polysaccharide thickener within the range of 0.1 to 10 parts in accordance with the degree of viscosity thereof, since the viscosity of polysaccharide thickener varies depending on its kind. For example, among the above-mentioned polysaccharide thickener, locustbean gum and guar gum of high viscosity may be preferably used in an amount of from 0.1 to 2 parts, and when the amount thereof is less than 0.1, the resulting product would have a poor water retention. When it exceeds 2 parts, the product would be sticky and thus give poor texture. On the other hand, gum arabic, tamarind seed gum and pullulan of low viscosity may be preferably used in an amount of from 4 to 10 parts, and when the amount thereof is less than 4, the resulting product would have a poor water retention. When it exceeds 10 parts, the product would be sticky and thus give poor texture.

Further, the high speed stirring is performed at a temperature lower than 10° C., the mixture cannot be homogeneously dispersed. When this temperature exceeds 80° C., on the other hand, only a poor emulsion stability is achieved. When the stirring speed is less than 1,000 rpm, only a poor emulsion stability is achieved. When it exceeds 10,000 rpm, on the other hand, the obtained product has a poor water retention. When the stirring time is shorter than 1 minute, the mixture cannot be homogeneously dispersed. When it exceeds 10 minutes, on the other hand, the obtained product has a poor water retention.

The mixture of the dehydrated vegetable and the polysaccharide thickener and the seasoning solution may contain additives such as common salt, sodium citrate or sodium bicarbonate, if required.

Next, the emulsified mixture thus obtained is mixed with one or more the above-mentioned fish meat, poultry meat, cattle meat or artificial meat to thereby give a flake style food.

The amount of the meat (fish meat, poultry meat, cattle meat or artificial meat) may preferably range from 60 to 95% by weight based on the total weight of the mixture of the emulsified product and the meat, though the present invention is not restricted thereby.

The emulsified product and the meat may be mixed together by stirring for 1 to 3 minutes with the use of, for example, a kneader.

The flake style food thus obtained is then filled in a container, sealed and thermally sterilized to thereby give a flake style food product.

EXAMPLES

To further illustrate the present invention, the following Examples and Comparative Examples will be given.

Example 1

Tuna (weighing 4.1 kg) caught in the South Seas by using a purse seiner boat was thawed and the head and internals were removed. Then the fish was cooked in a cooker at 103° C. When the temperature of the center of the fish reached 67° C., the cooking was ceased and the bones, skins and gills of the fish were removed. Further, the fish meat was divided into white meat and dark meat (i.e., cleaning). After the completion of the cleaning, the white meat was processed into flakes with a flaker to thereby give tuna flakes.

Separately, dehydrated onion chips, locustbean gum, common salt and sodium bicarbonate were added to a common seasoning broth at a ratio as specified in Table 1. Then the obtained mixture was stirred at a high speed of 3,000 rpm at 45° C. for 4 minutes. Thus an emulsified mixed paste was obtained.

Next, the above-mentioned tuna flakes and the above-mentioned paste were fed into a kneader together at a ratio specified in Table 1. Then the mixture was stirred for 1 minute. 1005-g portions of the mixture thus obtained were packed in retort pouches and sealed under a reduced pressure of 650 mmHg. The mixture thus packaged was then sterilized by heating at 120° C. for 40 minutes under an elevated pressure of 2 kg/cm$^2$. Thus the flake style food of the present invention was obtained.

TABLE 1

| Material | % by weight |
| --- | --- |
| tuna flakes | 78.0 |
| seasoning broth | 18.7 |
| dehydrated onion chips | 2.5 |
| locustbean gum | 0.4 |
| common salt | 0.2 |
| sodium bicarbonate | 0.2 |
| total | 100.0 |

The flake style food of the present invention thus obtained was stored at 35° C. for 2 weeks and at room temperature for 6 months and the change during the storage period was monitored in each case. As a result, the flake style food neither became watery nor suffered from water liberation in each case. That is to say the flake style food of the present invention had a good keeping stability and retained the inherent wettable palatable ingredients.

The flake style food of the present invention, which had been stored at room temperature for 6 months, was mixed with mayonnaise and used in the preparation of tuna sandwiches. As a result, the bread of the sandwiches did not become watery at all.

Example 2

The materials listed in Table 2 were treated at a ratio specified in Table 2 in the same manner as the one described in Example 1. Thus a flake style food of the present invention was obtained.

TABLE 2

| Material | % by weight |
| --- | --- |
| tuna flakes | 78.0 |
| seasoning broth | 18.3 |
| dehydrated onion chips | 2.5 |
| carboxymethylcellulose | 0.8 |
| common salt | 0.2 |

TABLE 2-continued

| Material | % by weight |
| --- | --- |
| sodium bicarbonate | 0.2 |
| total | 100.0 |

Example 3

The materials listed in Table 3 were treated at a ratio specified in Table 3 in the same manner as the one described in Example 1. Thus a flake style food of the present invention was obtained.

TABLE 3

| Material | % by weight |
| --- | --- |
| tuna flakes | 78.0 |
| seasoning broth | 17.6 |
| dehydrated onion chips | 2.5 |
| pullulan | 1.5 |
| common salt | 0.2 |
| sodium bicarbonate | 0.2 |
| total | 100.0 |

Example 4

The materials listed in Table 4 were treated at a ratio specified in Table 4 in the same manner as the one described in Example 1. Thus a flake style food of the present invention was obtained.

TABLE 4

| Material | % by weight |
| --- | --- |
| tuna flakes | 78.0 |
| seasoning broth | 18.7 |
| dehydrated mashed carrot | 2.5 |
| locustbean gum | 0.4 |
| common salt | 0.2 |
| sodium bicarbonate | 0.2 |
| total | 100.0 |

Example 5

The materials listed in Table 5 were treated at a ratio specified in Table 5 in the same manner as the one described in Example 1. Thus a flake style food of the present invention was obtained.

TABLE 5

| Material | % by weight |
| --- | --- |
| tuna flakes | 78.0 |
| seasoning broth | 18.7 |
| mashed dehydrated pumpkin | 2.5 |
| locustbean gum | 0.4 |
| common salt | 0.2 |
| sodium bicarbonate | 0.2 |
| total | 100.0 |

Example 6

The materials listed in Table 6 were treated at a ratio specified in Table 6 in the same manner as the one described in Example 1. Thus a flake style food of the present invention was obtained.

TABLE 6

| Material | % by weight |
| --- | --- |
| tuna flakes | 78.0 |
| seasoning broth | 18.7 |
| dehydrated mashed potato | 2.5 |
| locustbean gum | 0.4 |
| common salt | 0.2 |
| sodium bicarbonate | 0.2 |
| total | 100.0 |

Example 7

The materials listed in Table 7 were treated at a ratio specified in Table 7 in the same manner as the one described in Example 1. Thus a flake style food of the present invention was obtained.

TABLE 7

| Material | % by weight |
| --- | --- |
| tuna flakes | 78.0 |
| seasoning broth | 18.7 |
| dehydrated mashed sweet potato | 2.5 |
| locustbean gum | 0.4 |
| common salt | 0.2 |
| sodium bicarbonate | 0.2 |
| total | 100.0 |

Example 8

The materials listed in Table 8 were treated at a ratio specified in Table 8 in the same manner as the one described in Example 1. Thus a flake style food of the present invention was obtained.

TABLE 8

| Material | % by weight |
| --- | --- |
| tuna flakes | 78.0 |
| seasoning broth | 18.7 |
| dehydrated apple pulp | 2.5 |
| locustbean gum | 0.4 |
| common salt | 0.2 |
| sodium bicarbonate | 0.2 |
| total | 100.0 |

Example 9

The materials listed in Table 9 were treated at a ratio specified in Table 9 in the same manner as the one described in Example 1. Thus a flake style food of the present invention was obtained.

TABLE 9

| Material | % by weight |
| --- | --- |
| tuna flakes | 78.0 |
| seasoning broth | 18.7 |

TABLE 9-continued

| Material | % by weight |
|---|---|
| dehydrated onion chips | 1.3 |
| dehydrated mashed pumpkin | 1.2 |
| locustbean gum | 0.4 |
| common salt | 0.2 |
| sodium bicarbonate | 0.2 |
| total | 100.0 |

Example 10

The materials listed in Table 10 were treated at a ratio specified in Table 10 in the same manner as the one described in Example 1. Thus a flake style food of the present invention was obtained.

TABLE 10

| Material | % by weight |
|---|---|
| tuna flakes | 78.0 |
| seasoning broth | 18.7 |
| dehydrated onion chips | 2.5 |
| locustbean gum | 0.2 |
| guar gum | 0.2 |
| common salt | 0.2 |
| sodium bicarbonate | 0.2 |
| total | 100.0 |

Comparative Example 1

The procedure of Example 1 was repeated except that the dehydrated onion chips and the locustbean gum were not added and the seasoning broth was used at a ratio of 21.6 wt %. Thus a flake style food was obtained.

Comparative Example 2

The materials listed in Table 11 were treated at a ratio specified in Table 11 in the same manner as the one described in Example 1. Thus a flake style food was obtained.

TABLE 11

| Material | % by weight |
|---|---|
| tuna flakes | 78.0 |
| seasoning broth | 17.6 |
| corn starch | 4.0 |
| common salt | 0.2 |
| sodium bicarbonate | 0.2 |
| total | 100.0 |

Comparative Example 3

The procedure of Comparative Example 2 was repeated except that the corn starch was replaced with the dehydrated onion chips. Thus a flake style food was obtained.

Preserving Test Example 1

The flake style foods of the present invention of the above Examples 1 to 10 and those of the above Comparative Examples 1 to 3 were stored at room temperature for 2 weeks. Then the occurrence of water liberation in each sample was observed. Further, the flavor, texture and color tone of each product were evaluated after storing at room temperature for 2 weeks. Table 12 summarizes the results.

TABLE 12

| Item | Dehydrated vegetable and Polysaccharide thickener | Water liberation | Flavor | Texture | Color tone |
|---|---|---|---|---|---|
| Ex. No. | | | | | |
| 1 | dehydrated onion chip locustbean gum | no | very good | good | very good |
| 2 | dehydrated onion chip carboxmethlcellulose | no | very good | very good | very good |
| 3 | dehydrated onion chip pullulan | no | very good | very good | very good |
| 4 | dehydrated mashed carrot locustbean gum | no | good | good | good |
| 5 | dehydrated mashed pumpkin locustbean gum | no | good | good | good |
| 6 | dehydrated mashed potato locustbean gum | no | good | good | good |
| 7 | dehydrated mashed sweet potato locustbean gum | no | good | good | good |
| 8 | dehydrated apple pulp locustbean gum | no | good | good | good |
| 9 | dehydrated onion chip dehydrated mashed pumpkin locustbean gum | no | good | good | good |
| 10 | dehydrated onion chip locustbean gum guar gum | no | very good | good | good |
| Comp. Ex. No. | | | | | |
| 1 | none | yes | good | poor | poor |
| 2 | corn starch | yes | good | poor | very good |
| 3 | dehydrated onion chip | some | very good | very good | very good |

As the above Table 12 shows, each of the flake style foods of Examples 1 to 10 comprising dehydrated vegetables and polysaccharide thickener showed no deterioration in water absorption, did not suffer from water liberation, and showed excellent flavor, texture and color tone, after the completion of the storage following the heat sterilization. In contrast, the flake style food of Comparative Example 1 suffered from extreme water liberation and had a poor texture and bad color tone. Further, the flake style food of Comparative Example 2 containing corn starch suffered from water liberation due to the thermal denaturation of the starch and aging during the storage period, and the texture is sticky. Furthermore, the flake style food of Comparative Example 3 suffered from some water liberation and the effect for preventing arising water liberation is inferior to that of flake style food of the present invention in Examples 1 to 10.

Example 11

A frozen beef chuck block (25 kg/case) was thawed and dipped in a 3% aqueous solution of common salt for 18 hours. After draining, the meat was cooked in a cooker at 103° C. When the temperature at the center of the lump reached 67° C., the cooking was ceased and the meat was quickly cooled with cold air until the temperature at the center of the lump was reduced to 10 ° C. Next, the meat was processed into flakes with a flaker to thereby give beef flakes.

Separately, the materials (except beef flakes) listed in Table 13 were treated at the ratio specified in Table 13 in the same manner as the one described in Example 1. Thus an emulsified mixed paste was obtained.

Then the above-mentioned beef flakes and the above-mentioned paste were fed into a kneader at the ratio specified in Table 13 and mixed together by stirring therein for 1 minute. 1005-g portions of the mixture thus obtained were packed in retort pouches and sealed under a reduced pressure of 650 mmHg. The mixture thus packaged was then sterilized by heating at 120° C. for 40 minutes under an elevated pressure of 2 kg/cm². Thus the flake style food of the present invention was obtained.

TABLE 13

| Material | % by weight |
| --- | --- |
| beef flakes | 79.0 |
| seasoning broth | 16.8 |
| dehydrated mashed sweet potato | 3.0 |
| guar gum | 0.4 |
| common salt | 0.4 |
| sodium bicarbonate | 0.4 |
| total | 100.0 |

The flake style food of the present invention thus obtained was stored at 35° C. for 2 weeks and at room temperature for 6 months and the change during the storage period was monitored in each case. As a result, the flake style food neither became watery nor suffered from water liberation at all in each case.

Example 12

Bone-free chicken thigh meat was cooked in a cooker at 103° C. until the temperature at the center of the lump reached 75° C. Then the cooking was ceased and the meat was quickly cooled with cold air until the temperature at the center of the lump was reduced to 10 ° C. After removing the skin, the meat was dipped in a rice boiler filled with hot water at 95° C. for 30 seconds so as to remove collagen adhering to its surface. Next, the meat was processed into flakes with a flaker to thereby give chicken flakes. In addition, tuna flakes were produced in the same manner as the one described in Example 1.

Separately, the materials (except chicken flakes and tuna flakes) listed in Table 14 were treated at the ratio specified in Table 14 in the same manner as the one described in Example 1. Thus an emulsified mixed paste was obtained.

Then the chicken flakes, the tuna flakes and the paste were fed into a kneader at the ratio specified in Table 14 and mixed together by stirring therein for 1 minute. 1005-g portions of the mixture thus obtained were packed in retort pouches and sealed under a reduced pressure of 650 mmHg. The mixture thus packaged was then sterilized by heating at 120° C. for 40 minutes under at elevated pressure of 2 kg/cm². Thus the flake style food of the present invention was obtained.

TABLE 14

| Material | % by weight |
| --- | --- |
| chicken flakes | 45.0 |
| tuna flakes | 33.0 |
| seasoning broth | 18.7 |
| dehydrated onion chips | 2.5 |

TABLE 14-continued

| Material | % by weight |
| --- | --- |
| guar gum | 0.4 |
| common salt | 0.2 |
| sodium bicarbonate | 0.2 |
| total | 100.0 |

The flake style food of the present invention thus obtained was stored at 35° C. for 2 weeks and at room temperature for 6 months and the change during the storage period was monitored in each case. As a result, the flake style food neither became watery nor suffered from water liberation in each case.

Comparative Example 4

The materials listed in Table 15 were treated at a ratio specified in Table 15 in the same manner as the one described in Example 11. Thus a flake style food was obtained.

TABLE 15

| Material | % by weight |
| --- | --- |
| beef flakes | 79.0 |
| seasoning broth | 16.8 |
| dehydrated mashed sweet potato | 3.4 |
| common salt | 0.4 |
| sodium citrate | 0.4 |
| total | 100.0 |

Preserving Test Example 2

The flake style foods of the present invention of the above Examples 11 and 12 and the flake style food of the above Comparative Example 4 were stored at room temperature for 2 weeks. Then the occurrence of water liberation in each sample was observed. Further, the flavor, texture and color tone of each product were evaluated after storing at room temperature for 2 weeks. Table 16 summarizes the results.

TABLE 16

| Item | Dehydrated vegetable and Polysaccharide thickener | Water liberation | Flavor | Texture | Color tone |
| --- | --- | --- | --- | --- | --- |
| Ex. No. | | | | | |
| 11 | dehydrated mashed sweet potato guar gum | no | good | good | good |
| 12 | dehydrated onion chips guar gum | no | good | good | good |
| Comp. Ex. No. | | | | | |
| 4 | dehydrated mashed sweet potato | some | good | good | good |

As the above Table 16 shows, each of the flake style foods of the present invention of Examples 11 and 12 comprising dehydrated vegetables and polysaccharide thickener showed no deterioration in water absorption, did not suffer from water liberation, and showed good flavor, texture and color tone, after the completion of the storage following the heat sterilization. In contrast, the flake style food of Comparative Example 4 showed some water liberation, although the flavor, texture and color tone thereof were good.

Example 13

The materials listed in Table 17 were treated at a ratio specified in Table 17 in the same manner as the one described in Example 12. Thus a flake style food of the present invention was obtained.

TABLE 17

| Material | % by weight |
|---|---|
| chicken flakes | 45.0 |
| tuna flakes | 33.0 |
| seasoning broth | 18.7 |
| dehydrated onion chips | 2.5 |
| xanthan gum | 0.4 |
| common salt | 0.2 |
| sodium bicarbonate | 0.2 |
| total | 100.0 |

The flake style food of the present invention thus obtained was stored at 35° C. for 2 weeks and at room temperature for 6 months and the change during the storage period was monitored in each case. As a result, the flake style food neither became watery nor suffered from water liberation in each case.

What is claimed is:

1. A process for producing a flake style food which comprises adding a dehydrated vegetable and a polysaccharide thickener to a seasoning solution, emulsifying the obtained mixture by stirring at a high speed of from 1,000 to 10,000 rpm within a temperature range of from 10° to 80° C. for 1 to 10 minutes and mixing the emulsified product thus obtained with one or more of fish meat, poultry meat or cattle meat which is in the form of flakes.

2. A process for producing a flake style food as claimed in claim 1, wherein said dehydrated vegetable is at least one selected from the group consisting of ground or mashed dehydrated carrot, pumpkin, onion, sweet potato and potato, dehydrated apple pulp and a dietary fiber powder, and said polysaccharide thickener is at least one selected from the group consisting of guar gum, locustbean gum, tamarind seed gum, xanthan gum, gum arabic, pectin, agar, alginic acid, carrageenan, pullulan, curdlan, gellan gum, konjak powder, cellulose and derivatives thereof, and processed starch.

3. A process for producing a flake style food as claimed in claim 2, wherein said dehydrated vegetable is used in an amount of from 5 to 25 parts by weight per 100 parts by weight of the seasoning solution;

said polysaccharide thickener is used in an amount of from 0.1 to 10 parts by weight per 100 parts by weight of the seasoning solution; and said fish meat, poultry meat or cattle meat is used in such an amount as to adjust its content in the total mixture of said emulsified product and said fish meat, poultry meat or cattle meat to 60 to 95% by weight.

4. A process for producing a flake style food as claimed in claim 1, wherein said dehydrated vegetable is used in an amount of from 5 to 25 parts by weight and said polysaccharide thickener is used in an amount of from 0.1 to 10 parts by weight per 100 parts by weight of the seasoning solution.

5. A process for producing a flake style food as claimed in claim 1, wherein said fish meat, poultry meat or cattle meat is used in such an amount as to adjust its content in the total mixture of said emulsified product and said fish meat, poultry meat or cattle meat to 60 to 95% by weight.

\* \* \* \* \*